May 27, 1924.
U-H. KUNOKI
1,495,699
RESILIENT WHEEL
Filed May 21, 1920
2 Sheets-Sheet 1
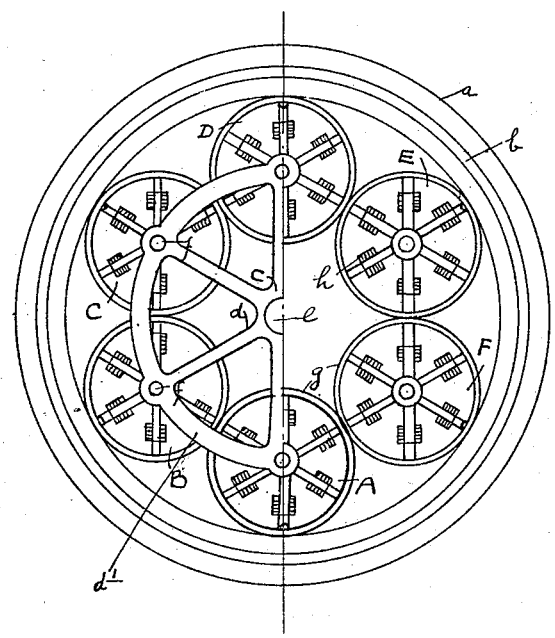
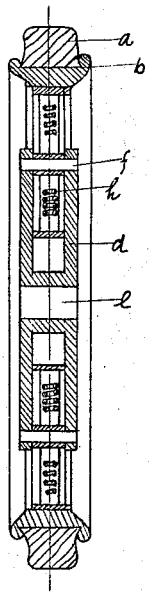
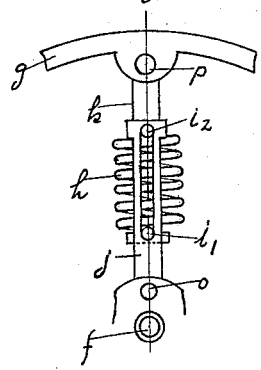
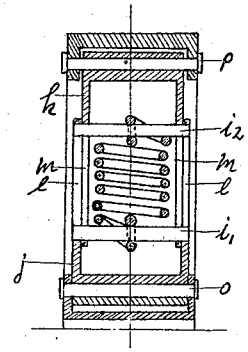
Inventor:
U Hyoe Kunoki

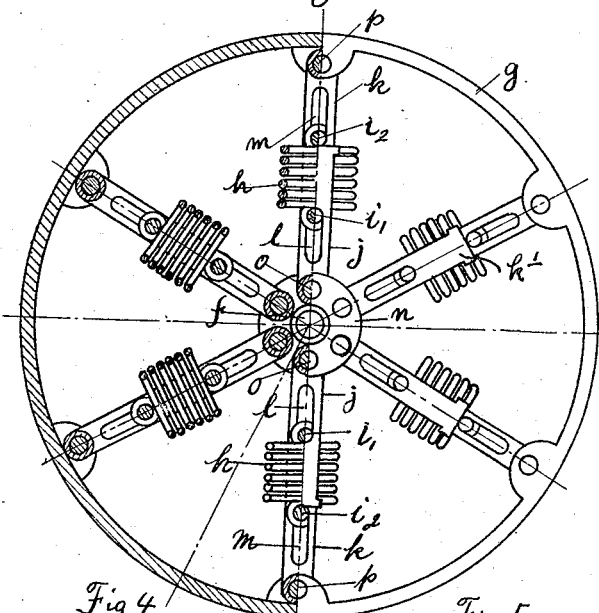
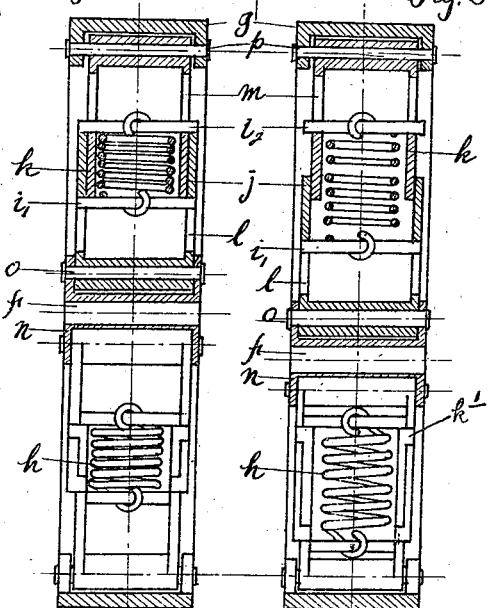

Patented May 27, 1924.

1,495,699

UNITED STATES PATENT OFFICE.

U-HYOE KUNOKI, OF TOKYO, JAPAN.

RESILIENT WHEEL.

Application filed May 21, 1920. Serial No. 383,127.

*To all whom it may concern:*

Be it known that U-HYOE KUNOKI, subject of the Emperor of Japan, residing at No. 5 Sanchome Muromachi, Nihonbashi-ku, Tokyo, Japan, has invented certain new and useful Improvements in Resilient Wheels, of which the following is a specification.

This invention relates to improvements in resilient wheels and has for its object to provide a wheel structure possessing a high degree of resiliency designed to prevent transmission of shocks from the wheel rim to the axle or vice versa and which is of comparatively simple construction affording convenient accessibility of the parts thereof such as necessary to effect repair or adjustment.

With these and other objects in view, the invention consists of certain novel features of construction, combination and arrangement of parts as will be hereinafter more fully described and claimed.

In the accompanying drawings:

Figure 1 is a side elevation of the improved wheel, a portion of the hub carried frame being removed.

Fig. 2 is a diametrical sectional view through the wheel.

Fig. 3 is an enlarged side elevation, partly in section of one of the resilient elements removed from the wheel.

Figs. 4 and 5 are enlarged vertical sectional views through the type of resilient element illustrated in Fig. 3, showing the action of the springs when stressed.

Figs. 6 and 7 are fragmentary side and sectional views, of a modification of a spring device for the wheel.

Referring to the drawings in detail, the letters A, B, C, D, E and F, designate generally a series of resilient elements each of which is composed of an annular member $g$ arranged internally of and attached to a wheel felly $b$ carrying the preferred type of tire $a$.

The hub $e$ of the wheel is provided with spaced series of radiating arms $d$ which are connected at their outer ends by ring-like members $d'$. The extremities of each two adjacent radial arms $d$ of the respective series are connected by pins or bolts $f$ which latter are centered with respect to the axes of the annular members $g$ by groups of springs $h$ which are confined in a radial position between each annular member $g$ and the pin $f$.

Referring more particularly to Fig. 3 wherein the construction of one of the resilient elements A is illustrated in detail, $n$ indicates a hub through which the pin $f$ passes. The hub $n$ is formed with spaced parallel flanges receiving a series of uniformly spaced pins $o$ to which are pivotally attached pairs of arms $j$. These arms $j$ are arranged radially with respect to the axis of the hub $n$ and slidably receive therebetween pairs of arms $k$ pivotally secured by bolts $p$ to the annular member $g$. In this manner, the hub $n$ is permitted to move radially with respect to the axis of the annular member $g$ but is prevented from moving axially with respect thereto.

The adjacent extremities of the arms $j$ and $k$ are provided with angular extensions $k'$ which embrace each other and maintain them substantially in alinement during radial movement of the hub with respect to the annular member $g$, although sufficient freedom of movement is afforded to prevent stiffness. The inner and outer arms $j$ and $k$, respectively, are provided with longitudinally elongated slots $l$ and $m$, respectively, on which are arranged pins $i^1$ and $i^2$ which are attached to the opposite extremities of the springs $h$. The tension of the springs $h$ normally maintain the pins $i^1$ and $i^2$ in engagement with the end walls of the slots $l$ and $m$ and thus maintain the hub $n$ in concentrically spaced relation with respect to the annular member $g$.

In use, the springs $h$ of the several resilient elements A to F normally maintain the hubs $n$ in concentric relation with respect to the annular members $g$ and consequently maintain the main hub $e$ of the wheel in concentric relation to the rim or felly $b$. It is evident, however, that the hub $e$ is capable of radial movement with respect to the felly $b$ and when such movement occurs, the shifting of the position of the hub carried arms $d$ with respect to the felly $b$ causes the hubs $n$ of the resilient elements to shift their position with respect to the annular members $g$, the latter movement, it will be understood, being resisted by the several groups of springs $h$. When the pressure on the wheel hub or tire is relieved, the several hubs $n$ are restored to concentric relation to their annular members $g$ under the influence of the springs $h$ and simultaneously the main wheel hub *e* is restored to its concentric position with respect to the felly *b*.

In the type of resilient element illustrated in Figs. 4 and 5, the springs *h* are of the contractile type, but if preferred, the springs of the expansion type may be substituted as suggested in Figs. 6 and 7. When this type of spring is utilized, it is evident that the pins $i^1$ and $i^2$ are normally maintained in engagement with the ends of the slots *l* and *m* opposite to the ends which are engaged, when springs of the contractile type, such as shown in Figs. 4 and 5, are employed, although the action of the springs is substantially identical in maintaining the hub *n* normally in concentric relation to the annular member *g*.

I claim—

1. A resilient wheel comprising a felly, a hub, a circular series of resilient elements arranged within the felly, each resilient element including an outer annular member, and a spring centered hub member, the several resilient elements lying in the same plane and the annular members thereof having peripheral engagement with each other and with said felly, and means connecting the first mentioned hub with the hub members of the resilient elements.

2. In a spring wheel, a felly, a main hub, a frame structure carried by said hub, a series of supplemental hubs carried by the frame structure, a series of annular members arranged within the felly and normally disposed concentric with respect to the supplemental hubs, slidably connected arms carried by each supplemental hub and the annular member associated therewith, and spring means co-acting with said arms and normally tending to maintain the supplemental hubs in concentric relation to the annular member.

3. In a resilient wheel, a felly, a main hub, spaced groups of arms radiating from the main hub, the arms of the respective groups being arranged side by side in pairs, ring members connecting the extremities of the arms of the respective groups, supplemental hub members carried by and confined between the points of juncture between the ring members and the arms and arranged parallel to the axis of the main hub, annular members carried by the felly, and spring means normally maintaining the supplemental hubs in concentric relation to the annular members.

4. In a spring wheel, a felly, a hub movable relative to the felly, and a resilient element interposed between the felly and hub, said resilient element including an annular member, a hub, a plurality of pairs of arms pivotally connected with the hub, pairs of companion arms pivotally connected with the annular member, the arms of each of the first mentioned pairs having sliding engagement with a pair of the second mentioned arms, and each of the first and second mentioned pairs of arms having alined slots therein, a pin slidably engaged in the slots of each pair of arms and engageable by the terminals of the companion arms, and spring means connecting the pins of each to pairs of companion arms whereby the hub is normally maintained in concentric relation to the annular member.

In testimony whereof he affixes his signature in the presence of two witnesses.

U-HYOE KUNOKI. [L. S.]

Witnesses:
GENJI KURIBARA,
C. ARCILLAS.